(12) United States Patent
Colak et al.

(10) Patent No.: US 12,548,996 B2
(45) Date of Patent: Feb. 10, 2026

(54) CONTROL APPARATUS AND POWER CONVERSION APPARATUS IN PHOTOVOLTAIC SYSTEM

(71) Applicant: TOSHIBA MITSUBISHI-ELECTRIC INDUSTRIAL SYSTEMS CORPORATION, Tokyo (JP)

(72) Inventors: Alperen Mustafa Colak, Tokyo (JP); Yoshihiro Tawada, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 162 days.

(21) Appl. No.: 18/688,428

(22) PCT Filed: Aug. 23, 2022

(86) PCT No.: PCT/JP2022/031698
§ 371 (c)(1),
(2) Date: Mar. 1, 2024

(87) PCT Pub. No.: WO2024/042608
PCT Pub. Date: Feb. 29, 2024

(65) Prior Publication Data
US 2024/0372354 A1    Nov. 7, 2024

(51) Int. Cl.
*H02H 3/26* (2006.01)
*H02H 7/122* (2006.01)
*H02H 7/20* (2006.01)

(52) U.S. Cl.
CPC ............ *H02H 3/26* (2013.01); *H02H 7/1222* (2013.01); *H02H 7/20* (2013.01)

(58) Field of Classification Search
CPC ........... H02H 3/26; H02H 7/1222; H02H 7/20
See application file for complete search history.

(56) References Cited

U.S. PATENT DOCUMENTS

| | | | |
|---|---|---|---|
| 2012/0203387 A1* | 8/2012 | Takayama | H01M 14/00 700/291 |
| 2013/0187466 A1* | 7/2013 | Sakai | H02J 7/0048 307/52 |

(Continued)

FOREIGN PATENT DOCUMENTS

| | | |
|---|---|---|
| JP | 2012-222853 A | 11/2012 |
| WO | WO 2012/023209 A1 | 2/2012 |

OTHER PUBLICATIONS

International Search Report & Written Opinion issued Sep. 27, 2022 in PCT/JP2022/031698, filed on Aug. 23, 2022, 11 pages (with English Translation).

*Primary Examiner* — Scott Bauer
(74) *Attorney, Agent, or Firm* — Oblon, McClelland, Maier & Neustadt, L.L.P.

(57) ABSTRACT

A control apparatus including a first operation control circuit configured to open a direct-current switch when a power conversion apparatus is in a waiting state and a first direct-current voltage value is greater than a predetermined first threshold, a clocking circuit configured to, when the direct-current switch is opened, clock an elapsed time after the direct-current switch is opened, and a soundness determination circuit configured to calculate a first difference voltage value that is a difference between the first direct-current voltage value and a second direct-current voltage value when the power conversion apparatus is in the waiting state and the direct-current switch is opened, and the elapsed time is greater than or equal to a predetermined first time, to determine that the direct-current switch is abnormal when the first difference voltage value is less than or equal to the predetermined second threshold.

6 Claims, 7 Drawing Sheets

(56) References Cited

U.S. PATENT DOCUMENTS

| | | | |
|---|---|---|---|
| 2014/0265638 A1* | 9/2014 | Orr | H02J 3/381 |
| | | | 307/131 |
| 2016/0197508 A1* | 7/2016 | Kruiskamp | H02J 7/0068 |
| | | | 307/130 |
| 2022/0021309 A1* | 1/2022 | Nishimura | H02M 1/007 |

* cited by examiner

STATE OF DIRECT-CURRENT VOLTAGE DURING
NORMAL OPERATION WITHOUT SWITCH CONTROL

STATE OF SOUNDNESS CHECK OF DC
SWITCHES WITH SWITCH CONTROL

CONTROL APPARATUS AND POWER CONVERSION APPARATUS IN PHOTOVOLTAIC SYSTEM

FIELD

The present invention relates to a control apparatus and a power conversion apparatus in a photovoltaic system.

BACKGROUND

In an existing photovoltaic system, a direct-current switch (direct-current breaker) is provided in an electric path (direct-current busbar) between a solar cell and a power conversion apparatus. The direct-current switch (direct-current breaker) is opened when abnormality or failure is detected in the power conversion apparatus (photovoltaic system), to shut off the electric path (direct-current busbar) (for example, see PTLs 1 and 2).

CITATION LIST

Patent Literature

[PTL 1] WO 2012/023209
[PTL 2] JP 2012-222853 A

SUMMARY

Technical Problem

Generally, in the case of the power conversion apparatus for photovoltaics or unless the power conversion apparatus is stopped, the direct-current switch is operated in a closed state even at night when power is not generated. Therefore, the direct-current switch is generally mainly opened only when failure of the power conversion apparatus is detected.

When failure of the power conversion apparatus is detected, the direct-current switch must be opened; however, if the direct-current switch itself is failed, the direct-current switch cannot be opened. For example, in a case where failure of the power conversion apparatus is detected but the direct-current switch cannot be opened, the power generated by the solar panel continuously flows, which increases a risk of failure expansion in the power conversion apparatus.

However, the direct-current switch is generally operated in the closed state even at night. Except in the case of annual inspection and the like and stoppage of the power conversion apparatus, the direct-current switch is not opened unless failure of the power conversion apparatus is detected. Accordingly, failure of the direct-current switch itself is not normally known in advance.

Therefore, an object of the present disclosure is to suppress failure expansion in the power conversion apparatus by routinely checking whether the direct-current switch in the photovoltaic system is normally operated (opened), and previously routinely checking soundness of the direct-current switch.

Solution to Problem

A control apparatus according to an aspect is a control apparatus in a power conversion apparatus of a photovoltaic system. The power conversion apparatus includes a direct-current switch and a direct-current capacitor that are disposed, in a direct-current busbar connected to a solar panel, in order from the solar panel side. The control apparatus includes: a voltage acquisition unit configured to acquire a first direct-current voltage value as a voltage of the solar panel and a second direct-current voltage value as a voltage of the direct-current capacitor; a first operation control unit configured to open the direct-current switch when the power conversion apparatus is in a waiting state and the first direct-current voltage value acquired by the voltage acquisition unit is greater than a predetermined first threshold; a clocking unit configured to, when the direct-current switch is opened by the first operation control unit, clock an elapsed time after the direct-current switch is opened; a soundness determination unit configured to calculate a first difference voltage value that is a difference between the first direct-current voltage value and the second direct-current voltage value acquired by the voltage acquisition unit when the power conversion apparatus is in the waiting state and the direct-current switch is opened, and the elapsed time clocked by the clocking unit is greater than or equal to a predetermined first time, to determine that the direct-current switch is normal when the first difference voltage value is greater than a predetermined second threshold, and to determine that the direct-current switch is abnormal when the first difference voltage value is less than or equal to the predetermined second threshold; and a second operation control unit configured to close the direct-current switch when the soundness determination unit determines that the direct-current switch is normal, and to stop the power conversion apparatus without closing the direct-current switch when the soundness determination unit determines that the direct-current switch is abnormal.

A control apparatus according to another aspect is a control apparatus in a power conversion apparatus of a photovoltaic system. The power conversion apparatus includes a direct-current switch and a direct-current capacitor that are disposed, in a direct-current busbar connected to a solar panel, in order from the solar panel side. The control apparatus includes: a voltage acquisition unit configured to acquire a first direct-current voltage value as a voltage of the solar panel and a second direct-current voltage value as a voltage of the direct-current capacitor; a first operation control unit configured to open the direct-current switch when the power conversion apparatus is in a waiting state and the first direct-current voltage value acquired by the voltage acquisition unit is less than a predetermined third threshold; a clocking unit configured to, when the direct-current switch is opened by the first operation control unit, clock an elapsed time after the direct-current switch is opened; a soundness determination unit configured to calculate a second difference voltage value that is a difference between the first direct-current voltage value and the second direct-current voltage value acquired by the voltage acquisition unit when the power conversion apparatus is in the waiting state and the direct-current switch is opened, and the elapsed time clocked by the clocking unit is greater than or equal to a predetermined second time, to determine that the direct-current switch is normal when the second difference voltage value is greater than a predetermined fourth threshold, and to determine that the direct-current switch is abnormal when the second difference voltage value is less than or equal to the predetermined fourth threshold; and a second operation control unit configured to close the direct-current switch when the soundness determination unit determines that the direct-current switch is normal, and to stop the power conversion apparatus without closing the direct-current switch when the soundness determination unit determines that the direct-current switch is abnormal.

A control apparatus according to still another aspect is a control apparatus in a power conversion apparatus of a photovoltaic system. The power conversion apparatus includes a direct-current switch and a direct-current capacitor that are disposed, in a direct-current busbar connected to a solar panel, in order from the solar panel side. The control apparatus includes: a voltage acquisition unit configured to acquire a first direct-current voltage value as a voltage of the solar panel and a second direct-current voltage value as a voltage of the direct-current capacitor; a first operation control unit configured to open the direct-current switch when the power conversion apparatus is in a waiting state and the first direct-current voltage value acquired by the voltage acquisition unit is greater than a predetermined first threshold, and to open the direct-current switch when the power conversion apparatus is in the waiting state and the first direct-current voltage value acquired by the voltage acquisition unit is less than a predetermined third threshold; a clocking unit configured to, when the direct-current switch is opened by the first operation control unit, clock an elapsed time after the direct-current switch is opened; a soundness determination unit configured to calculate a first difference voltage value that is a difference between the first direct-current voltage value and the second direct-current voltage value acquired by the voltage acquisition unit when the power conversion apparatus is in the waiting state and the direct-current switch is opened, and the elapsed time clocked by the clocking unit is greater than or equal to a predetermined first time, to determine that the direct-current switch is normal when the first difference voltage value is greater than a predetermined second threshold, to determine that the direct-current switch is abnormal when the first difference voltage value is less than or equal to the predetermined second threshold, to calculate a second difference voltage value that is a difference between the first direct-current voltage value and the second direct-current voltage value acquired by the voltage acquisition unit when the power conversion apparatus is in the waiting state and the direct-current switch is opened, and the elapsed time clocked by the clocking unit is greater than or equal to a predetermined second time, to determine that the direct-current switch is normal when the second difference voltage value is greater than a predetermined fourth threshold, and to determine that the direct-current switch is abnormal when the second difference voltage value is less than or equal to the predetermined fourth threshold; and a second operation control unit configured to close the direct-current switch when the soundness determination unit determines that the direct-current switch is normal, and to stop the power conversion apparatus without closing the direct-current switch when the soundness determination unit determines that the direct-current switch is abnormal.

A power conversion apparatus according to an aspect is a power conversion apparatus of a photovoltaic system. The power conversion apparatus includes a direct-current switch and a direct-current capacitor that are disposed, in a direct-current busbar connected to a solar panel, in order from the solar panel side. The power conversion apparatus includes: a first voltage sensor configured to detect a first direct-current voltage value as a voltage of the solar panel; a second voltage sensor configured to detect a second direct-current voltage value as a voltage of the direct-current capacitor; and any one of the above-described control apparatuses. The voltage acquisition unit acquires the first direct-current voltage value from the first voltage sensor, and acquires the second direct-current voltage value from the second voltage sensor.

Advantageous Effects of Invention

According to the present disclosure, it is possible to suppress failure expansion in the power conversion apparatus by routinely checking whether the direct-current switch in the photovoltaic system is normally operated (opened), and previously routinely checking soundness of the direct-current switch.

DESCRIPTION OF EMBODIMENT

An embodiment of a control apparatus and a power conversion apparatus in a photovoltaic system according to the present disclosure is described below with reference to drawings.

Configuration in Embodiment

Figure 1:
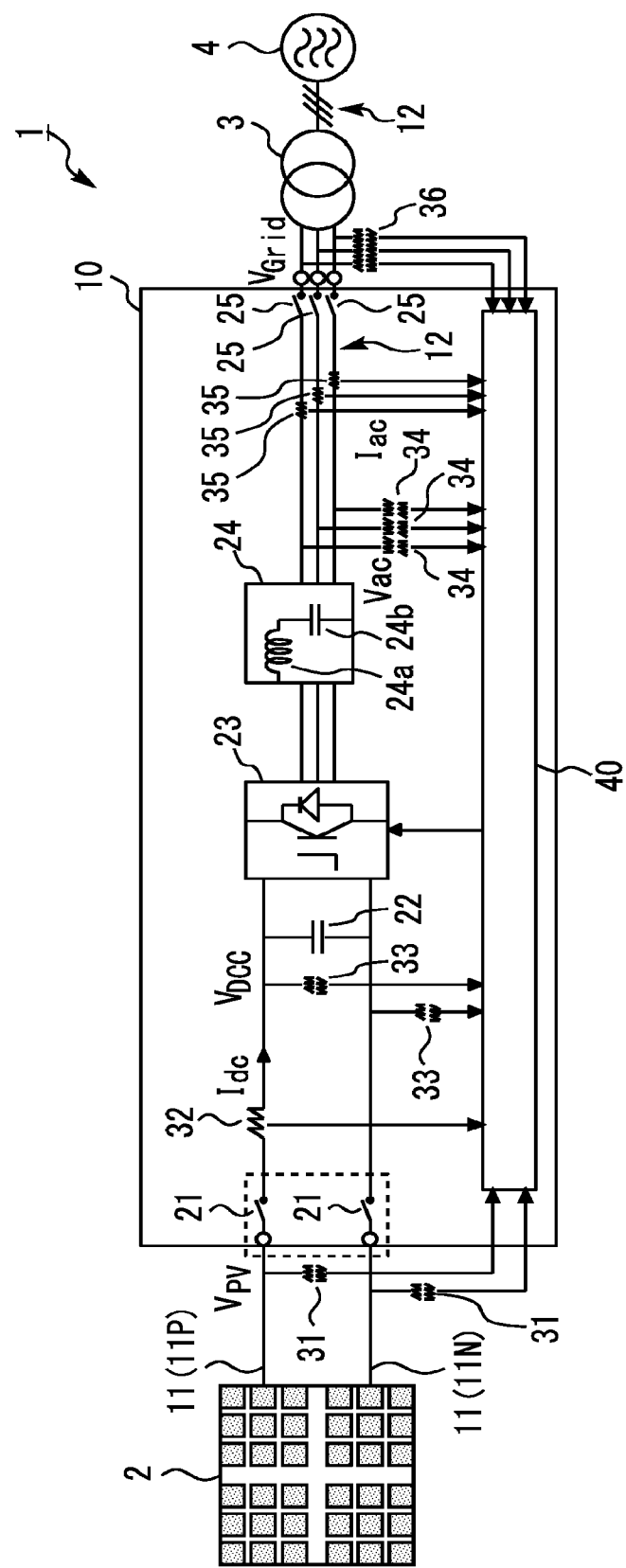
FIG. 1 is a diagram illustrating an example of a configuration of a power conversion apparatus in a photovoltaic system according to an embodiment.

FIG. 1 is a diagram illustrating an example of a configuration of a power conversion apparatus 10 in a photovoltaic system 1 according to the embodiment.

As illustrated in FIG. 1, the photovoltaic system 1 includes a solar panel 2, a transformer 3, an alternating-current power system 4, a power conversion apparatus 10, direct-current busbars 11, and an alternating-current circuit 12. The power conversion apparatus 10 is connected to the solar panel 2 through the direct-current busbars 11 on one end side on a left side in FIG. 1, and is connected to the alternating-current power system 4 through the alternating-current circuit 12 and the transformer 3 on another end side (output side) on a right side in FIG. 1. In the photovoltaic system 1, direct-current power generated by the solar panel 2 is converted into alternating-current power through the power conversion apparatus 10, and the converted alternating-current power is supplied to the alternating-current power system 4 through the transformer 3.

The solar panel (solar cell panel) 2 is connected to one end side of the power conversion apparatus 10 through the direct-current busbars 11. The solar panel 2 is also referred to as a solar module or a solar cell module, or simply referred to as a solar cell, a module, or the like. For example, the solar panel 2 is one panel obtained by combining a plurality of solar cells. The solar panel 2 may be, for example, a solar cell string obtained by combining a plurality of panels in series or in parallel, or a solar cell array obtained by combining solar cell strings. The solar panel 2 generates power by using sunlight, and generated direct-current power is supplied to the power conversion apparatus 10 through the direct-current busbars 11. In the following, in the present specification, the solar panel 2 is also referred to as "PV (Photovoltaics) panel 2".

One end of the transformer 3 is connected to an output side that is another end side of the power conversion apparatus 10 through the alternating-current circuit 12, and another end of the transformer 3 is connected to the alternating-current power system 4. The transformer 3 is a power device or an electronic component that converts a magnitude of a voltage of the alternating-current power by using electromagnetic induction. The transformer 3 transforms the voltage of the alternating-current power output from the power conversion apparatus 10 to a voltage having a predetermined magnitude, and outputs the voltage to the alternating-current power system 4.

The alternating-current power system (system) 4 is connected to the transformer 3, and is an integrated system of power generation, power transformation, power transmission, and power distribution to supply the alternating-current power transformed by the transformer 3 to power receiving facilities of consumers. For example, an unspecified load is connected to the alternating-current power system 4. In the following, in the present specification, the alternating-current power system 4 is also simply referred to as "system 4".

The power conversion apparatus (PCS: Power Conditioning System) 10 is, for example, a photovoltaics (PV)-power conversion apparatus (PV-PCS: Photovoltaics-Power Conditioning System). The power conversion apparatus (PCS) 10 converts the direct-current power supplied from the solar panel 2 into the alternating-current power, and outputs the converted alternating-current power to the system 4 side through the transformer 3. In the following, in the present specification, the power conversion apparatus 10 is also referred to as "PCS 10" or "PV-PCS 10".

The PCS 10 includes direct-current switches 21, a direct-current capacitor 22, an inverter circuit 23, an alternating-current filter 24, and alternating-current switches 25. The PCS 10 further includes first voltage sensors 31, a first current sensor 32, second voltage sensors 33, third voltage sensors 34, second current sensors 35, fourth voltage sensors 36, and a control apparatus 40. Note that the control apparatus 40 is electrically connected to each of the elements of the PCS 10.

In the PCS 10, the direct-current switches 21, the direct-current capacitor 22, and the inverter circuit 23 are disposed in order from the solar panel 2 side toward the inverter circuit 23, in the direct-current busbars 11 connected to the solar panel 2. The first voltage sensors 31 are disposed on the solar panel 2 side of the direct current switches 21. The first current sensor 32 and the second voltage sensors 33 are disposed between the direct-current switches 21 and the direct-current capacitor 22.

In the PCS 10, the inverter circuit 23, the alternating-current filter 24, and the alternating-current switches 25 are disposed in order from the inverter circuit 23 toward the transformer 3 (system 4) side, in the alternating-current circuit 12 connected to the system 4 through the transformer 3. The third voltage sensors 34 and the second current sensors 35 are disposed between the alternating-current filter 24 and the alternating-current switches 25. The fourth voltage sensors 36 are disposed on the transformer 3 (system 4) side of the alternating-current switches 25.

One ends of the direct-current busbars 11 are connected to the solar panel 2, and another ends of the direct-current busbars 11 are connected to a direct-current end of the inverter circuit 23. The direct-current busbars 11 include a positive electrode direct-current busbar 11P and a negative electrode direct-current busbar 11N, and supply the direct-current power generated by the solar panel 2 to the inverter circuit 23.

One end of the alternating-current circuit 12 is connected to an alternating-current end of the inverter circuit 23, and another end of the alternating-current circuit 12 is connected to the system 4 through the transformer 3. The alternating-current circuit 12 is, for example, a three-phase alternating-current circuit of a three-phase three-wire type that supplies three-phase alternating-current power obtained by combining single-phase alternating-current power of three systems shifted in phase of the current or voltage from one another, by using three electric wires or cables. The alternating-current circuit 12 supplies the alternating-current power converted by the inverter circuit 23, to the system 4 side.

In each of the direct-current busbars 11, the direct-current switch (direct current breaker) 21 is provided in series between the solar panel 2 and the inverter circuit 23. The direct-current switches 21 close (connect) or open (shut off) the direct-current busbars 11 between the solar panel 2 and the PCS 10 based on a close instruction or an open instruction from, for example, the control apparatus 40, an unillustrated host apparatus, or an operator. When the direct current switches 21 are opened, inflow of the direct-current power supplied from the solar panel 2 to the inverter circuit 23 is shut off. In the following, in the present specification, the direct-current switches 21 are also referred to as "direct-current breakers 21" or "DC (Direct Current) switches 21".

The direct-current capacitor 22 is provided, for example, between the positive electrode direct-current busbar 11P and the negative electrode direct-current busbar 11N of the direct current busbars 11 between the direct-current switches 21 and the direct-current end of the inverter circuit 23. The direct-current capacitor 22 is a smoothing capacitor smoothing a direct-current voltage output from the solar panel 2. For example, when the direct-current switches 21 are closed, the direct-current capacitor 22 is charged by the direct-current power from the solar panel 2 and the voltage thereof is increased, whereas when the direct-current switches 21 are opened, the direct-current capacitor 22 is discharged by, for example, an unillustrated discharge circuit or an unillustrated discharge resistor and the voltage thereof is reduced. In the following, in the present specification, the direct-current capacitor 22 is also referred to as "DC capacitor 22".

One end side as the direct-current end of the inverter circuit (inverter) 23 is connected to the direct-current capacitor 22 and the direct-current switches 21 through the direct-current busbars 11, and another end side as the alternating-current end is connected to the alternating-current filter 24 through the alternating-current circuit 12. The inverter circuit 23 is constructed by a plurality of switching elements such as IGBTs (Insulated Gate Bipolar Transistors). The inverter circuit 23 is controlled by, for example, a pulse width modulation (PWM) signal that is a gate driving signal (gate signal) for the switching elements generated by an inverter control unit 55 (see FIG. 2) descried below.

The inverter circuit 23 acquires the direct-current power supplied from the solar panel 2, from the one end side, converts the acquired direct-current power into the alternating-current power under the control of the pulse width modulation signal (gate signal), outputs the alternating-current power from the other end side as the output end, and supplies the alternating-current power to the alternating-current circuit 12. In the following, in the present specification, the inverter circuit 23 is also simply referred to as "inverter 23". Further, in the present specification, the pulse width modulation signal is also referred to as "PWM signal".

The alternating-current filter 24 is also referred to as AC (Alternating Current) filter, and is configured as, for example, an LC filter circuit (filter circuit) in which an alternating-current reactor 24a and an alternating-current capacitor 24b are connected in an L-shape. In the following, in the present specification, the alternating-current filter 24 is also referred to as "AC filter 24", the alternating-current reactor 24a is also referred to as "AC reactor 24a", and the alternating-current capacitor 24b is also referred to as "AC capacitor 24b".

The AC reactor 24a is, for example, a smoothing element having an effect of reducing noise and an effect of suppressing a surge voltage. The AC capacitor 24b is, for example, an electronic component storing or discharging electricity (charges). The AC filter 24 reduces ripple (vibration) generated when the switching elements of the inverter 23 are switched, and suppresses outflow of harmonics to the system 4 side, by the functions of the AC reactor 24a and the AC capacitor 24b.

The alternating-current switches (alternating-current breakers) 25 are each provided in series between the alternating-current filter 24 and the transformer 3 in the alternating-current circuit 12. The alternating-current switches 25 bring the alternating-current circuit 12 between the PCS 10 and the system 4 into a closed (connected) state or an open (disconnected) state, based on a close instruction or an open instruction from, for example, the control apparatus 40, the unillustrated host apparatus, or the operator. When the alternating-current switches 25 are opened, outflow of the alternating-current power supplied from the inverter 23 to the system 4 side is shut off. In the following, in the present specification, the alternating-current switches 25 are also referred to as "alternating-current breakers 25" or "AC switches 25".

The first voltage sensors 31 are, for example, well-known direct-current voltmeters or direct-current voltage sensors, and are disposed between the PV panel 2 and the inverter 23 to detect a direct-current voltage value $V_{PV}$ of the PV panel 2. Note that positions where the first voltage sensors 31 are disposed are not limited to the positions illustrated in FIG. 1, and the first voltage sensors 31 may be disposed at any positions as long as the first voltage sensors 31 can detect the direct-current voltage value $V_{PV}$ of the PV panel 2. In the following, in the present specification, the direct-current voltage value $V_{PV}$ of the PV panel is also referred to as "PV voltage $V_{PV}$" or simply referred to as "voltage value $V_{PV}$". The PV voltage $V_{PV}$ detected by the first voltage sensors 31 is acquired by the control apparatus 40.

The first current sensor 32 is, for example, a well-known direct-current ammeter or a direct current sensor, and is disposed between the DC switches 21 and the DC capacitor 22 to detect a direct current value $I_{dc}$ of the direct current flowing through the direct-current busbars 11. Note that a position where the first current sensor 32 is disposed is not limited to the position illustrated in FIG. 1, and the first current sensor 32 may be disposed at any position as long as the first current sensor 32 can detect the direct current value $I_{dc}$ of the direct current flowing through the direct-current busbars 11. In the following, in the present specification, the direct current value $I_{dc}$ of the direct current flowing through the direct-current busbars 11 is also referred to as "direct current Id" or simply referred to as "current value $I_{dc}$". The direct current $I_{dc}$ detected by the first current sensor 32 is acquired by the control apparatus 40.

The second voltage sensors 33 are, for example, well-known direct-current voltmeters or direct-current voltage sensors, and are disposed between the DC switches 21 and the DC capacitor 22 to detect a direct-current voltage value $V_{DCC}$ of the DC capacitor 22. Note that positions where the second voltage sensors 33 are disposed are not limited to the positions illustrated in FIG. 1, and the second voltage sensors 33 may be disposed at any positions as long as the second voltage sensors 33 can detect the direct-current voltage value $V_{DCC}$ of the DC capacitor 22. In the following, in the present specification, the direct-current voltage value $V_{DCC}$ of the DC capacitor 22 is also referred to as "capacitor voltage $V_{DCC}$" or "DCC voltage $V_{DCC}$", or simply referred to as "voltage value $V_{DCC}$". The capacitor voltage $V_{DCC}$ detected by the second voltage sensors 33 is acquired by the control apparatus 40.

The third voltage sensors 34 are, for example, well-known alternating-current voltmeters or alternating-current voltage sensors, and are disposed between the inverter 23 and the AC switches 25 to detect an alternating-current voltage value $V_{ac}$ of a three-phase alternating-current voltage that is an output voltage of the inverter 23. Note that positions where the third voltage sensors 34 are disposed are not limited to the positions illustrated in FIG. 1, and the third voltage sensors 34 may be disposed at any positions as long as the third voltage sensors 34 can detect the alternating-current voltage value $V_{ac}$ of the three-phase alternating-current voltage that is the output voltage of the inverter 23. In the following, in the present specification, the alternating-current voltage $V_{ac}$ of the three-phase alternating-current voltage that is the output voltage of the inverter 23 is also referred to as "inverter output voltage $V_{ac}$" or simply referred to as "voltage value $V_{ac}$". The inverter output voltage $V_{ac}$ detected by the third voltage sensors 34 is acquired by the control apparatus 40.

The second current sensors 35 are, for example, well-known alternating-current ammeters or alternating current sensors, and are disposed between the inverter 23 and the AC switches 25 to detect an alternating current value $I_{ac}$ of a three-phase alternating current that is an output current of the inverter 23. Note that positions where the second current sensors 35 are disposed are not limited to the positions illustrated in FIG. 1, and the second current sensors 35 may be disposed at any positions as long as the second current sensors 35 can detect the alternating current value $I_{ac}$ of the three-phase alternating current that is the output current of the inverter 23. In the following, in the present specification, the alternating current value $I_{ac}$ of the three-phase alternating current that is the output current of the inverter 23 is also referred to as the "inverter output current $I_{ac}$" or simply referred to as "current value $I_{ac}$". The inverter output current $I_{ac}$ detected by the second current sensors 35 is acquired by the control apparatus 40.

The fourth voltage sensors 36 are, for example, well-known alternating-current voltmeters or alternating-current voltage sensors, and are disposed between the AC switches 25 and the transformer 3 to detect an alternating-current voltage value $V_{Grid}$ of a system voltage that is a three-phase alternating-current voltage of the system 4. Note that positions where the fourth voltage sensors 36 are disposed are not limited to the positions illustrated in FIG. 1, and the fourth voltage sensors 36 may be disposed at any positions as long as the fourth voltage sensors 36 can detect the alternating-current voltage value $V_{Grid}$ of the system voltage that is the three-phase alternating-current voltage of the system 4. In the following, in the present specification, the alternating-current voltage value $V_{Grid}$ of the system voltage that is the three-phase alternating-current voltage of the system 4 is also referred to as "system voltage $V_{Grid}$" or simply referred to as "voltage value $V_{Grid}$". The system voltage $V_{Grid}$ detected by the fourth voltage sensors 36 is acquired by the control apparatus 40.

For example, the control apparatus 40 is provided inside or outside the PCS 10. Although wires and the like are partially omitted in the drawing, the control apparatus 40 is electrically connected to the components including the inverter 23 of the PCS 10 by cables or radio. Note that the control apparatus 40 may be realized as a function of an unillustrated inverter control circuit. Further, the control apparatus 40 may operate based on an instruction from, for example, the unillustrated host apparatus or the operator through an unillustrated operation unit. Note that the unillustrated host apparatus totally monitors and controls, for example, a plurality of PCSs 10, and is connected to each of the PCSs 10 by a cable or radio.

Figure 2:
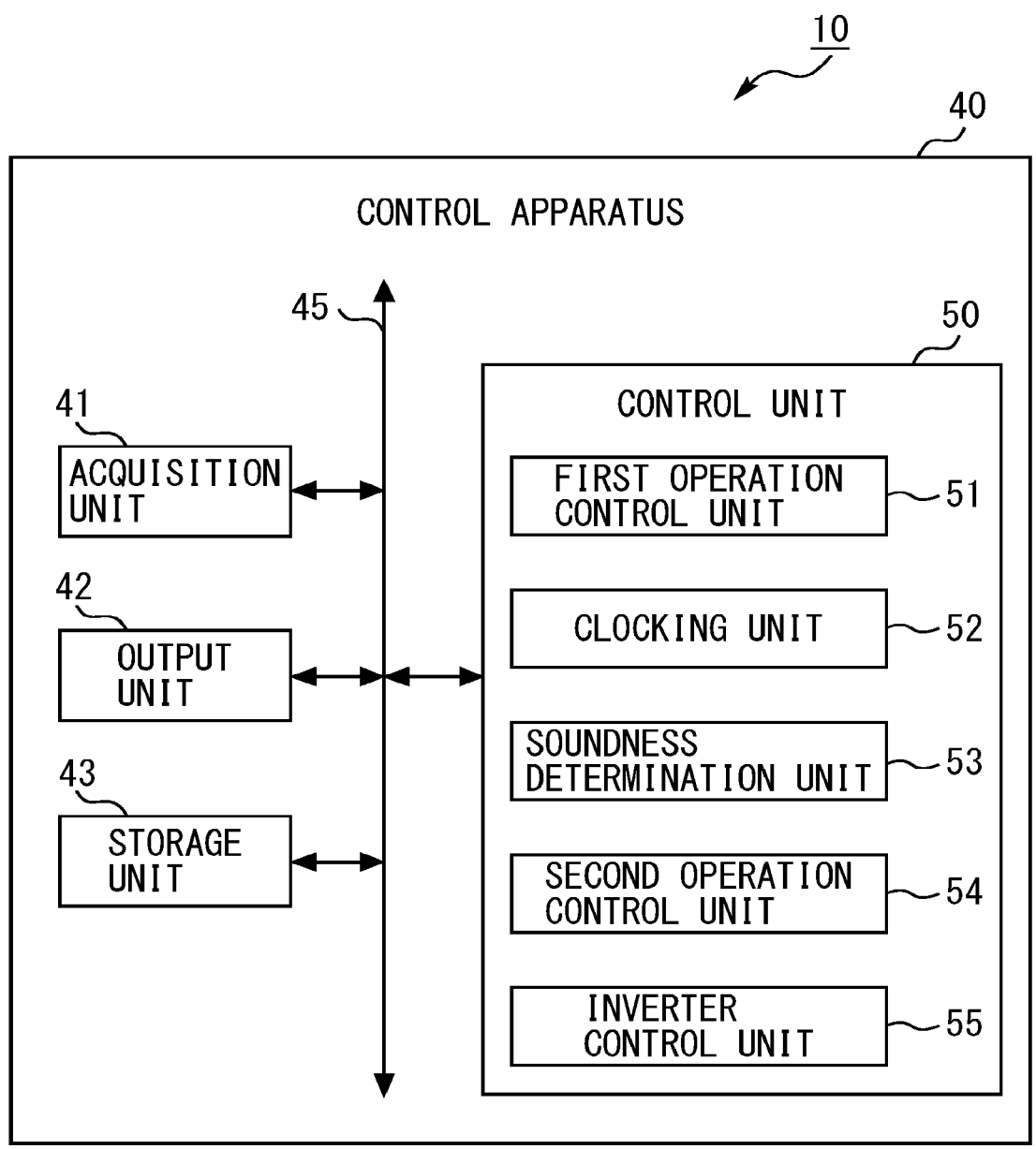
FIG. 2 is a diagram illustrating an example of a configuration of a control apparatus in the power conversion apparatus illustrated in FIG. 1.

FIG. 2 is a diagram illustrating an example of a configuration of the control apparatus 40 in the power conversion apparatus 10 illustrated in FIG. 1.

The control apparatus 40 detects failure of the DC switches 21 by using a detection logic described below, based on the PV voltage $V_{PV}$ detected by the first voltage sensors 31 and the capacitor voltage $V_{DCC}$ detected by the second voltage sensors 33 (see FIG. 3 to FIG. 5, etc.). The control apparatus 40 includes an acquisition unit 41, an output unit 42, a storage unit 43, a system bus 45, and a control unit 50. The acquisition unit 41, the output unit 42, the storage unit 43, and the control unit 50 are connected to one another through the system bus 45.

The acquisition unit 41 is connected to the first voltage sensors 31, the first current sensor 32, the second voltage sensors 33, the third voltage sensors 34, the second current sensors 35, the fourth voltage sensors 36, and the system bus 45. The acquisition unit 41 acquires the PV voltage $V_{PV}$ detected by the first voltage sensors 31, the direct current $I_{dc}$ detected by the first current sensor 32, and the capacitor voltage $V_{DCC}$ detected by the second voltage sensors 33. The acquisition unit 41 further acquires the inverter output voltage $V_{ac}$ detected by the third voltage sensors 34, the inverter output current $I_{ac}$ detected by the second current sensors 35, and the system voltage $V_{Grid}$ detected by the fourth voltage sensors 36. The acquisition unit 41 outputs, for example, the acquired voltage values and current values to the elements of the control apparatus 40 through the system bus 45. Note that the acquisition unit 41 is an example of a "voltage acquisition unit", the PV voltage $V_{PV}$ is an example of a "first direct-current voltage value", and the capacitor voltage $V_{DCC}$ is an example of a "second direct-current voltage value".

The output unit 42 is connected to the DC switches 21, the inverter 23, the AC switches 25, and the system bus 45. The output unit 42 may be connected to the unillustrated host apparatus and the like. The output unit outputs operation instructions to the DC switches 21, the inverter 23, and the AC switches 25 based on, for example, an instruction acquired from the control unit 50 through the system bus 45.

The storage unit 43 is a volatile or nonvolatile storage medium such as an HDD (Hard Disk Drive), an SSD (Solid State Drive), and other semiconductor memory, and is connected to the system bus 45. For example, the storage unit 43 stores programs necessary for operation of the units of the control apparatus 40, and writing and reading of various kinds of information to/from the storage unit 43 are performed by each of the units of the control apparatus 40. Further, the storage unit 43 stores, for example, the values acquired by the sensors such as the first voltage sensors 31 and the second voltage sensors 33, various kinds of calculation expressions and coefficients used for calculation by the control unit 50, and predetermined thresholds and predetermined determination values.

The storage unit 43 is connected to the units of the control apparatus 40 through the system bus 45 and the like so as to enable input/output of various kinds of information. Note that the storage unit 43 may be provided outside the control apparatus 40 and may be connected to the control apparatus 40 by a cable or radio. The storage unit 43 may be an external storage medium such as a memory card and a DVD (Digital Versatile Disc), an online storage, or the like. Further, the storage unit 43 may be used in common with a memory 92 (see FIG. 6) described below.

The system bus (bus) 45 is a data transmission path (bus) connecting the components inside the control apparatus 40, and connects the acquisition unit 41, the output unit 42, the storage unit 43, and the control unit 50 to one another so as to enable input/output of various kinds of information.

The control unit 50 includes a processor 91 (see FIG. 6) described below that operates by executing programs, such as a CPU (Central Processing Unit), an MPU (Micro Processing Unit), and a GPU (Graphics Processing Unit). The control unit 50 totally controls operation of the PCS 10 by executing predetermined programs stored in, for example, the storage unit 43 or the memory 92 (see FIG. 6) described below to operate the processor 91. Note that the control unit 50 may control the operation of the PCS 10 based on an instruction received from the unillustrated host apparatus or an instruction received from the unillustrated operator through the unillustrated operation unit.

The control unit 50 functions as the following units by executing predetermined programs stored in, for example, the storage unit 43 or the memory 92 (see FIG. 6) described below. The control unit 50 functions as a first operation control unit 51, a clocking unit 52, a soundness determination unit 53, a second operation control unit 54, and the inverter control unit 55. The above-described functions may be realized by programs executed by the processor 91 (see FIG. 6) described below in a processing circuit 90 (see FIG. 6) described below held by the control apparatus 40, or may be realized by hardware 93 (see FIG. 6) described below. The first operation control unit 51, the clocking unit 52, the soundness determination unit 53, the second operation control unit 54, and the inverter control unit 55 each execute predetermined programs to perform the following processing.

When the PSC 10 is in a waiting state (standby mode) and the PV voltage $V_{PV}$ acquired by the acquisition unit 41 is greater than a predetermined first threshold $V_{TH1}$, the first operation control unit 51 outputs an operation instruction to open the DC switches 21. When the PSC 10 is in the waiting state (standby mode) and the PV voltage $V_{PV}$ acquired by the acquisition unit 41 is less than a predetermined third threshold $V_{TH3}$, the first operation control unit 51 outputs an operation instruction to open the DC switches 21. The operation instruction output from the first operation control unit 51 is output to the DC switches 21 through the system bus 45 and the output unit 42, thereby opening the DC switches 21.

The clocking unit 52 is, for example, a well-known timer. When the DC switches 21 are opened by the first operation control unit 51, the clocking unit 52 clocks an elapsed time after the DC switches 21 are opened. In other words, for example, when the first operation control unit 51 outputs the operation instruction to open the DC switches 21, the clocking unit 52 clocks an elapsed time after the operation instruction to open the DC switches 21 is output. In addition, the clocking unit 52 outputs the clocked elapsed time to the soundness determination unit 53.

The soundness determination unit 53 acquires the elapsed time clocked by the clocking unit 52. When the DC switches 21 are opened while the PCS 10 is in the waiting state, and the elapsed time clocked by the clocking unit 52 becomes greater than or equal to a predetermined time $T_1$, the soundness determination unit 53 calculates a difference voltage $V_1$ that is a difference between the PV voltage $V_{PV}$ and the capacitor voltage $V_{DCC}$. Further, when the difference voltage $V_1$ is greater than a predetermined second threshold $V_{TH2}$, the soundness determination unit 53 determines that the DC switches 21 are normal. When the difference voltage $V_1$ is less than or equal to the predetermined second threshold $V_{TH2}$, the soundness determination unit 53 determines that the DC switches 21 are abnormal.

When the DC switches 21 are opened while the PCS 10 is in the waiting state, and the elapsed time clocked by the clocking unit 52 becomes equal to or greater than a predetermined time $T_2$, the soundness determination unit 53 calculates a difference voltage $V_2$ that is a difference between the PV voltage $V_{PV}$ and the capacitor voltage $V_{DCC}$. When the difference voltage $V_2$ is greater than a predetermined fourth threshold $V_{TH4}$, the soundness determination unit 53 determines that the DC switches 21 are normal. When the difference voltage $V_2$ is less than or equal to the predetermined fourth threshold $V_{TH4}$, the soundness determination unit 53 determines that the DC switches 21 are abnormal.

The soundness determination unit 53 outputs a result of the determination whether the DC switches 21 are normal or abnormal, to the second operation control unit 54. Note that the predetermined time $T_1$ is an example of a "predetermined first time", the predetermined time $T_2$ is an example of a "predetermined second time", the difference voltage $V_1$ is an example of a "first difference voltage value", and the difference voltage $V_2$ is an example of a "second difference voltage value".

The second operation control unit 54 acquires the determination result by the soundness determination unit 53. When the soundness determination unit 53 determines that the DC switches 21 are normal, the second operation control unit 54 outputs the operation instruction to close the DC switches 21. The operation instruction to close the DC switches 21, output from the second operation control unit 54 is output to the DC switches 21 through the system bus 45 and the output unit 42, and the DC switches 21 are accordingly closed.

In contrast, when the soundness determination unit 53 determines that the DC switches 21 are abnormal, the second operation control unit 54 does not output the operation instruction to close the DC switches 21, but outputs an operation instruction to stop the PCS 10. The operation instruction to stop the PCS 10, output from the second operation control unit 54 is output to the inverter control unit 55. As a result, the inverter 23 is stopped under the control of the inverter control unit 55, and the PCS 10 is accordingly stopped. Note that the operation instruction to stop the PCS 10, output from the second operation control unit 54 may be output to the AC switches 25 through the system bus 45 and the output unit 42. In this case, the AC switches 25 are opened to stop output of the alternating-current power from the PCS 10 to the system 4 side.

To stop the PCS 10, the second operation control unit 54 may notify the failure of the DC switches 21 to the unillustrated host apparatus, an unillustrated display apparatus, and the like through the system bus 45 and the output unit 42. In this case, the PCS 10 is stopped in response to a stop instruction from the unillustrated host apparatus, or a stop instruction from the operator monitoring the unillustrated display apparatus.

The inverter control unit 55 performs PWM control based on, for example, three-phase output voltage instruction signals and a carrier signal having a triangular waveform, thereby generating the gate signal. The inverter control unit 55 controls the unillustrated switching elements of the inverter 23 by the generated gate signal, thereby totally controlling the operation of the inverter 23. When acquiring the operation instruction to stop the PCS 10, output from the second operation control unit 54, the inverter control unit 55 controls the unillustrated switching elements of the inverter 23 to stop (interlock) the inverter 23, thereby stopping the PCS 10.

Note that details of the operation of the above-described units in the PCS 10 (control apparatus 40) are described below (see FIG. 3 to FIG. 5, etc.).

<Operation in Embodiment>

FIG. 3 is a diagram illustrating outline of the operation of the power conversion apparatus 10 and the control apparatus 40 illustrated in FIG. 1 and FIG. 2.

Figure 3A:
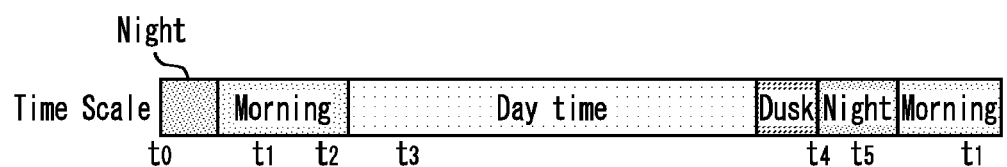
FIG. 3 is a diagram illustrating outline of operation of the power conversion apparatus and the control apparatus illustrated in FIG. 1 and FIG. 2.
Figure 3B:
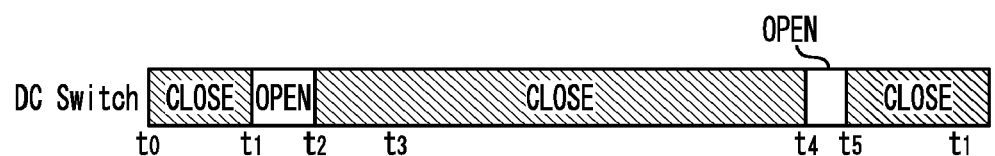
Figure 3C:
Figure 3D:
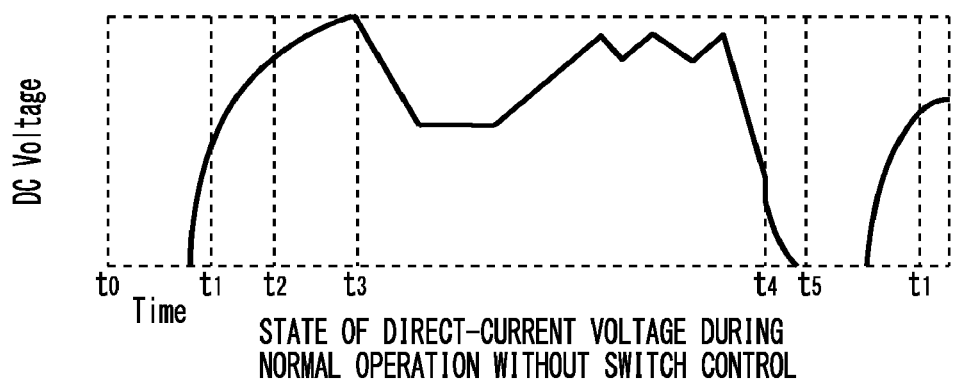
Figure 3E:
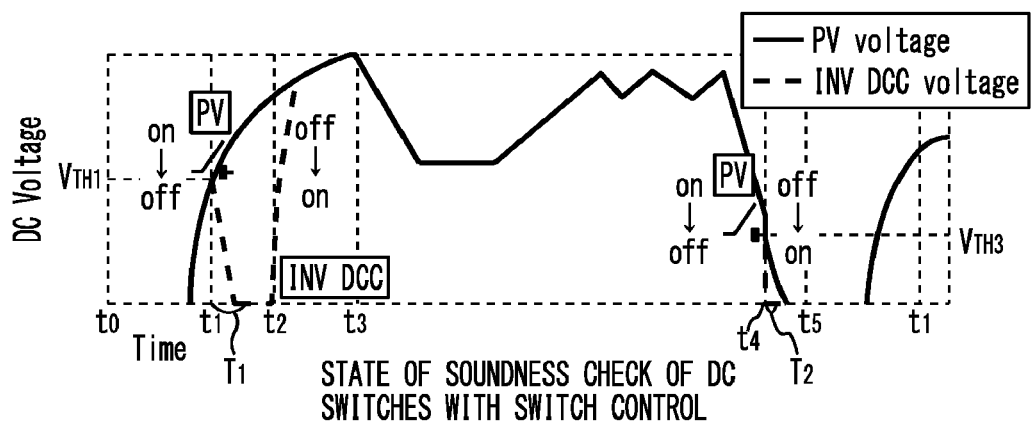

FIG. 3A is a diagram illustrating a time axis. FIG. 3B is a diagram illustrating a state of the DC switches 21. FIG. 3C is a diagram illustrating a state of the PCS 10. FIG. 3D is a diagram illustrating a state of the PV voltage $V_{PV}$ when control of the DC switches 21 by a soundness check function for the DC switches 21 according to the present disclosure is not performed. FIG. 3E is a diagram illustrating states of the PV voltage $V_{PV}$ and the capacitor voltage $V_{DCC}$ when control of the DC switches 21 by the soundness check function for the DC switches 21 according to the present disclosure is performed. Note that in FIG. 3A to FIG. 3E, $t_0$ to $t_5$ each represent a time, and the times $t_0$ to $t_5$ denoted by the same reference numerals respectively indicate the same times $t_0$ to $t_5$. Note that although the description is omitted, the times to, $t_1$, . . . are repeated again after the time $t_5$.

As described above, FIG. 3A is the diagram illustrating the time axis. As illustrated in FIG. 3A, the time passes from night, morning, daytime, dusk, night, to morning with time $t_0$ to $t_5$. Sunrise occurs in the middle of morning, and sunset occurs when the time passes from dusk to night.

As described above, FIG. 3B is the diagram illustrating the state of the DC switches 21. As illustrated in FIG. 3B, the DC switches 21 are closed at night, are opened at time $t_1$ in the morning, and are closed at time $t_2$ in the morning. The DC switches 21 are kept closed in the daytime, are opened at time $t_4$ between dusk and night, and are closed at time $t_5$ at night.

As described above, FIG. 3C is the diagram illustrating the state of the PCS 10. As illustrated in FIG. 3C, the PCS 10 is in the standby mode (Stand by) until time $t_3$, is put into an operation mode (Operation) at time $t_3$, and is put into the standby mode (Stand by) again at time $t_4$.

As described above, FIG. 3D is the diagram illustrating the state of the PV voltage $V_{PV}$ when control of the DC switches 21 by the soundness check function for the DC switches 21 according to the present disclosure is not performed. In FIG. 3D, a vertical axis indicates a voltage, and a lateral axis indicates a time. When control of the DC switches 21 by the soundness check function for the DC switches 21 according to the present disclosure is not performed, the DC switches 21 are kept closed.

In this case, as illustrated in FIG. 3D, the PV voltage $V_{PV}$ is gradually increased from the time of sunrise in the morning, and the PV voltage $V_{PV}$ is continuously increased until the PCS 10 is put into the operation mode at time $t_3$ in the daytime. Thereafter, the PV voltage $V_{PV}$ is gradually decreased from the time of dusk, the PCS 10 is put into the standby mode at time $t_4$ when sunset occurs between dusk and night, and the PV voltage $V_{PV}$ becomes zero at time $t_5$ at night.

As described above, FIG. 3E is the diagram illustrating the states of the PV voltage $V_{PV}$ and the capacitor voltage $V_{DCC}$ when control of the DC switches 21 by the soundness check function for the DC switches 21 according to the present disclosure is performed. In FIG. 3E, a solid line indicates the PV voltage $V_{PV}$, and a dashed line indicates the capacitor voltage $V_{DCC}$.

When control of the DC switches 21 by the soundness check function for the DC switches 21 according to the present disclosure is performed, the DC switches 21 are opened at time $t_1$ in the morning, and are closed at time $t_2$ in the morning as illustrated in FIG. 3B. In this case, as illustrated in FIG. 3E, at time $t_1$ when the DC switches 21 are opened, the PV voltage $V_{PV}$ indicated by the sold line is continuously increased, whereas the capacitor voltage $V_{DCC}$ indicated by the dashed line is reduced because the capacitor is discharged by, for example, the discharge circuit. Thereafter, at time $t_2$ when the DC switches 21 are closed, the capacitor voltage $V_{DCC}$ indicated by the dashed line is increased again until the capacitor voltage $V_{DCC}$ becomes equal to the PV voltage $V_{PV}$ indicated by the sold line.

Further, as illustrated in FIG. 3B, the DC switches 21 are opened at time $t_4$ between dusk and night, and are closed at time $t_5$ at night. In this case, as illustrated in FIG. 3E, at time $t_4$ when the DC switches 21 are opened, the PV voltage $V_{PV}$ indicated by the solid line is gradually reduced, whereas the capacitor voltage $V_{DCC}$ indicated by the dashed line is steeply reduced. Thereafter, the PV voltage $V_{PV}$ indicated by the solid line and the capacitor voltage $V_{DCC}$ indicated by the dashed line both become zero. Since the photovoltaics is not performed at night, the capacitor voltage $V_{DCC}$ and the PV voltage $V_{PV}$ are both zero at time $t_5$ when the DC switches 21 are closed.

<Operation in Embodiment in Case of Sunrise>

Figure 4:
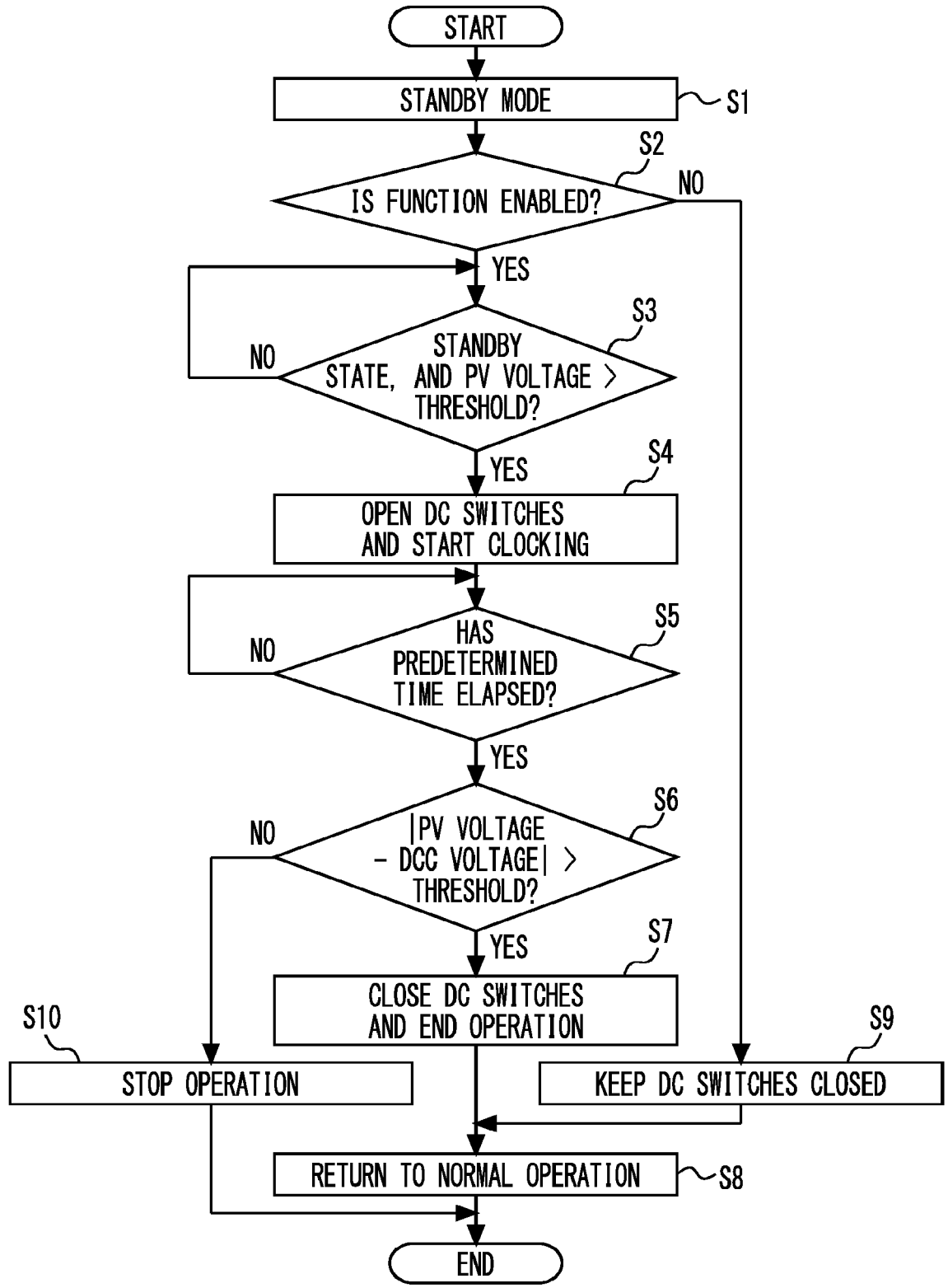
FIG. 4 is a flowchart illustrating an example of operation of the control apparatus illustrated in FIG. 1 and FIG. 2 in a case of sunrise.

FIG. 4 is a flowchart illustrating an example of operation of the control apparatus 40 illustrated in FIG. 1 and FIG. 2 in a case of sunrise. The operation in the flowchart illustrated in FIG. 4 is started when the PCS 10 is in the standby mode (waiting state).

In step S1, the control unit 50 of the control apparatus 40 acquires information indicating that the PCS 10 is in the standby mode. The PCS 10 is put into the standby mode, for example, at night when power generation is not performed by the PV panel 2. For example, when the PCS 10 is in the standby mode, the power conversion by the inverter 23 is not performed or the AC switches 25 are opened. In contrast, for example, when the PCS 10 is in the operation mode, the power conversion by the inverter 23 is performed and the AC switches 25 are closed.

However, even when the PCS 10 is in the standby mode or in the operation mode, the DC switches 21 are kept closed. Note that, in the present specification, the standby mode is also referred to as "waiting state", "waiting mode", or "standby state", and the operation mode is also referred to as "operating state", "operating mode", or "operation state".

In step S2, the control unit 50 of the control apparatus 40 determines whether the soundness check function of the PCS 10 according to the present disclosure is enabled. When the control unit 50 determines that the soundness check function for the DC switches 21 according to the present disclosure is enabled (Yes side), the processing proceeds to step S3. In contrast, when the control unit 50 determines that the soundness check function for the DC switches 21 according to the present disclosure is not enabled (No side), the processing proceeds to step S9.

In step S3, the first operation control unit 51 of the control unit 50 determines whether the PV voltage $V_{PV}$ acquired by the acquisition unit 41 is greater than the predetermined first threshold $V_{TH1}$, when the information indicating that the PCS 10 is in the standby state is acquired. For example, in FIG. 3E, the PV voltage $V_{PV}$ is greater than the predetermined first threshold $V_{TH1}$ at time $t_1$.

When the first operation control unit 51 determines that the PV voltage $V_{PV}$ is greater than the predetermined first threshold $V_{TH1}$ (Yes side), the processing proceeds to step S4. In contrast, when the first operation control unit 51 determines that the PV voltage $V_{PV}$ is less than or equal to the predetermined first threshold $V_{TH1}$ (No side), the processing in step S3 is repeated until the PV voltage $V_{PV}$ becomes greater than the predetermined first threshold $V_{TH1}$.

When the first operation control unit 51 of the control unit 50 determines that the PV voltage $V_{PV}$ is greater than the predetermined first threshold $V_{TH1}$ in step S3 (S3: Yes), the first operation control unit 51 of the control unit 50 outputs the operation instruction to open the DC switches 21 in step S4. As a result, the DC switches 21 are opened. The clocking unit 52 of the control unit 50 clocks the elapsed time after the operation instruction to open the DC switches 21 is output (after DC switches 21 are opened). For example, in FIG. 3B, the DC switches 21 are opened at time $t_1$.

In step S5, the soundness determination unit 53 of the control unit 50 acquires the elapsed time clocked by the clocking unit 52, and determines whether the elapsed time clocked by the clocking unit 52 becomes greater than or equal to the predetermined time $T_1$. For example, in FIG. 3E, it is determined that the elapsed time becomes greater than or equal to the predetermined time $T_1$ at a time between time $t_1$ and time $t_2$.

When the soundness determination unit 53 determines that the elapsed time becomes greater than or equal to the predetermined time $T_1$ (Yes side), the processing proceeds to step S6. In contrast, when the soundness determination unit 53 determines that the elapsed time is not greater than or equal to the predetermined time $T_1$ (No side), the processing in step S5 is repeated until the elapsed time becomes greater than or equal to the predetermined time $T_1$.

In step S6, the soundness determination unit 53 of the control unit 50 acquires the PV voltage $V_{PV}$ and the capacitor voltage $V_{DCC}$ when the elapsed time after the DC switches 21 are opened becomes greater than or equal to the predetermined time $T_1$. Further, the soundness determination unit 53 calculates the difference voltage $V_1$ that is the difference between the acquired PV voltage $V_{PV}$ and the acquired capacitor voltage $V_{DCC}$. The soundness determination unit 53 determines whether the difference voltage $V_1$ is greater than the predetermined second threshold $V_{TH2}$.

For example, in FIG. 3E, the soundness determination unit 53 calculates the difference voltage $V_1$ between the PV voltage $V_{PV}$ indicated by the solid line and the capacitor voltage $V_{DCC}$ indicated by the dashed line, at a time between time $t_1$ and time $t_2$. Further, the soundness determination unit 53 determines whether the calculated difference voltage $V_1$ is greater than the predetermined second threshold $V_{TH2}$. Note that, for example, the predetermined second threshold $V_{TH2}$ is a value previously evaluated by simulation or the like, and is preferably a fixed value that enables sure determination of failure without being affected by weather and the like.

For example, as illustrated in FIG. 3E, when the DC switches 21 are normally opened in step S4 and the predetermined time $T_1$ elapses in step S5, the PV voltage $V_{PV}$ indicated by the solid line is continuously increased because the power generation by the PV panel is continued. In contrast, the capacitor voltage $V_{DCC}$ indicated by the dashed line is reduced because the capacitor is discharged by, for example, the unillustrated discharge circuit or the unillustrated discharge resistor.

Accordingly, when the DC switches 21 are normally opened in step S4, the difference voltage $V_1$ between the PV voltage $V_{PV}$ and the capacitor voltage $V_{DCC}$ becomes a value greater than the predetermined second threshold $V_{TH2}$. Therefore, when the soundness determination unit 53 determines that the difference voltage $V_1$ is greater than the predetermined second threshold $V_{TH2}$, the soundness determination unit 53 determines that failure or abnormality does not occur in the DC switches 21, the DC switches 21 are normally opened, and the DC switches 21 are normal (sound).

In contrast, for example, when the DC switches 21 are not normally opened in step S4 and the predetermined time $T_1$ elapses in step S5, the PV voltage $V_{PV}$ and the capacitor voltage $V_{DCC}$ are in a situation different from the example illustrated in FIG. 3E. In other words, in the case where the DC switches 21 are not normally opened, the direct-current busbars 11 are not shut off. Therefore, the PV voltage $V_{PV}$ and the capacitor voltage $V_{DCC}$ are both continuously increased as long as the power generation by the PV panel is continued. Thus, the capacitor voltage $V_{DCC}$ is not reduced as illustrated in FIG. 3E.

Accordingly, when the DC switches 21 are not normally opened in step S4, the difference voltage $V_1$ between the PV voltage $V_{PV}$ and the capacitor voltage $V_{DCC}$ does not become a value greater than the predetermined second threshold $V_{TH2}$. Therefore, when the soundness determination unit 53 determines that the difference voltage $V_1$ is less than or equal to the predetermined second threshold $V_{TH2}$, the soundness determination unit 53 determines that failure or abnormality occurs in the DC switches 21, the DC switches 21 are not normally opened, and the DC switches 21 are abnormal (unsound).

Therefore, when the soundness determination unit 53 determines that the difference voltage $V_1$ is greater than the predetermined second threshold $V_{TH2}$ in step S6 (Yes side), the soundness determination unit 53 determines that the DC switches 21 are normal, and the processing proceeds to step S7. In contrast, when the soundness determination unit 53 determines that the difference voltage $V_1$ is less than or equal to the predetermined second threshold $V_{TH2}$ (No side), the soundness determination unit 53 determines that the DC switches 21 are abnormal, and the processing proceeds to step S10.

When the second operation control unit 54 of the control unit 50 acquires a determination result indicating that the DC switches 21 are normal, by the soundness determination unit 53 (S6: Yes), the second operation control unit 54 of the control unit 50 outputs the operation instruction to close the DC switches 21 in step S7. As a result, the DC switches 21 are closed. Thereafter, the control unit 50 ends the soundness check operation for the DC switches 21 according to the present disclosure, and the processing proceeds to step S8. As a result, for example, as illustrated in FIGS. 3B and 3E, when the DC switches 21 are closed at time $t_2$, the capacitor voltage $V_{DCC}$ that has been reduced, indicated by the dashed line is increased again until the capacitor voltage $V_{DCC}$ becomes equal to the PV voltage $V_{PV}$ indicated by the solid line.

In step S8, the control unit 50 shifts operation of the PCS 10 to normal operation. As a result, for example, as illustrated in FIGS. 3C and 3E, the capacitor voltage $V_{DCC}$ is increased again. When the PV voltage $V_{PV}$ and the capacitor voltage $V_{DCC}$ are each increased to a predetermined voltage value, the control unit 50 puts the PCS 10 into the operation mode at time $t_3$.

In other words, for example, the inverter control unit 55 of the control unit 50 controls the unillustrated switching elements of the inverter 23 by the gate signal generated by the PWM control, to operate the inverter 23. Further, for example, the control unit 50 closes the AC switches 25 to output the alternating-current power from the PCS 10 to the system 4 side. Thereafter, the control unit 50 ends the processing in the flowchart.

When it is determined that the soundness check function for the DC switches 21 according to the present disclosure is not enabled in step S2 (S2: No), the DC switches 21 are kept closed in step S9. In this case, the soundness check operation for the DC switches 21 according to the present disclosure is not performed, and the control unit 50 causes the processing to proceed to step S8.

Note that when it is determined that the soundness check function for the DC switches 21 according to the present disclosure is not enabled in step S2 (S2: No), the control unit 50 may notify information (alert) indicating that the soundness check function for the DC switches 21 has abnormality, to the unillustrated host apparatus, the unillustrated display apparatus, and the like. Thereafter, the control unit 50 may cause the processing to proceed to step S8. Alternatively, for example, the control unit 50 may stop the operation of the PCS 10 until a fact that the DC switches 21 are normal (sound) is confirmed.

When it is determined that the difference voltage $V_1$ is less than or equal to the predetermined second threshold $V_{TH2}$ in step S6 (S6: No), the second operation control unit 54 outputs the operation instruction to stop the PCS 10 without outputting the operation instruction to close the DC switches 21 in step S10. In other words, when the soundness determination unit 53 determines that the DC switches 21 are abnormal in step S6, the second operation control unit 54 outputs the operation instruction to stop the PCS 10 without outputting the operation instruction to close the DC switches 21. Further, the control unit 50 ends the processing in the flowchart.

The operation instruction to stop the PCS 10 is output to the inverter control unit 55, and the inverter 23 is accordingly stopped to stop the PCS 10. In other words, when the inverter control unit 55 acquires the operation instruction to stop the PCS 10, the inverter control unit 55 controls the unillustrated switching elements of the inverter 23 to stop (interlock) the inverter 23, thereby stopping the PCS 10.

Further, the operation instruction to stop the PCS 10 may be output to the AC switch 25, and the AC switches 25 may be accordingly opened to stop output of the alternating-current power from the PCS 10 to the system 4 side. Alternatingly, the second operation control unit 54 may notify the failure of the DC switches 21 to the unillustrated host apparatus, the unillustrated display apparatus, and the like, and the PCS 10 may be stopped in response to the stop instruction from the unillustrated host apparatus or the stop instruction from the operator monitoring the unillustrated display apparatus.

<Operation in Embodiment in Case of Sunset>

Figure 5:
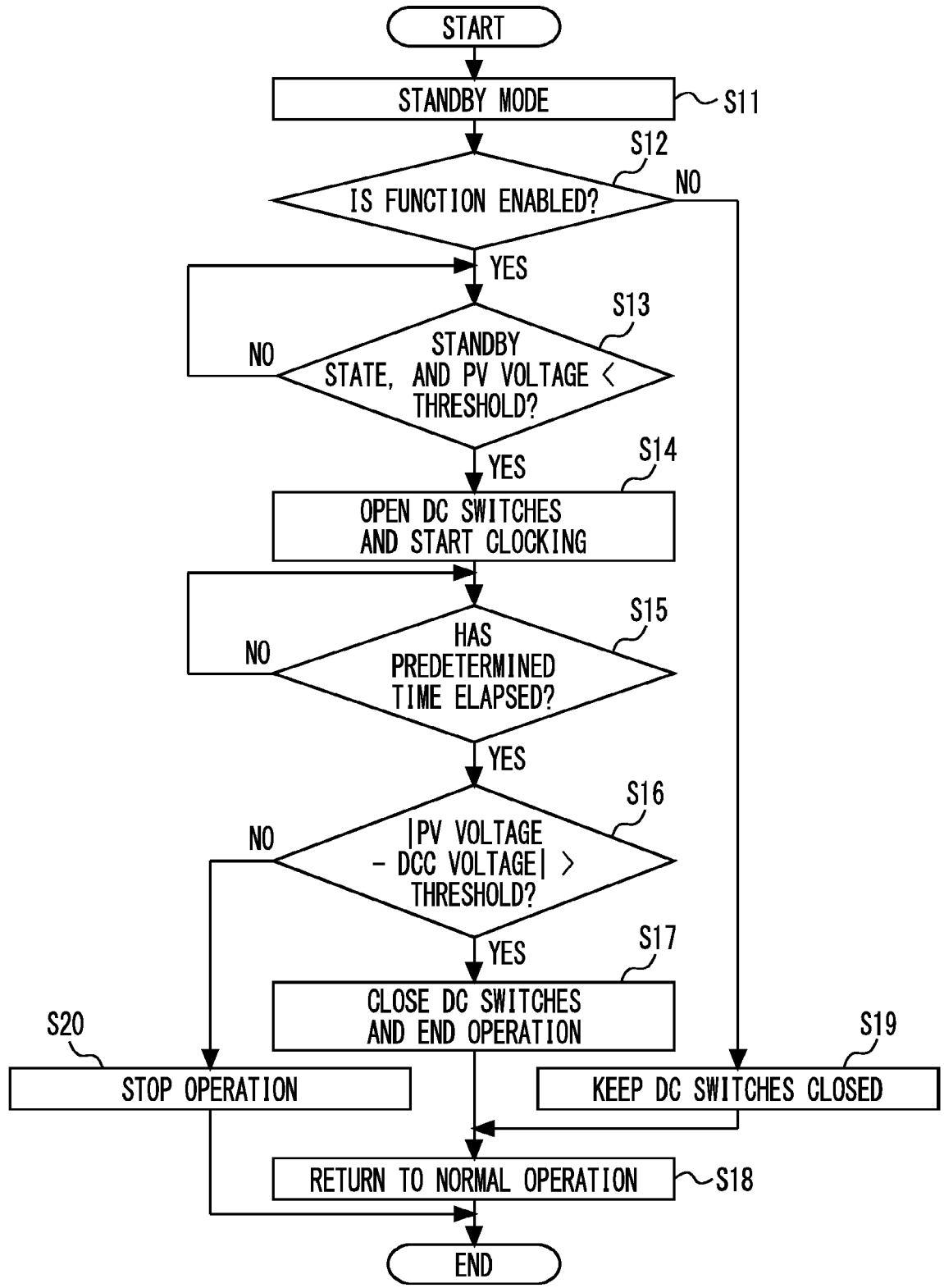
FIG. 5 is a flowchart illustrating an example operation of the control apparatus illustrated in FIG. 1 and FIG. 2 in a case of sunset.

FIG. 5 is a flowchart illustrating an example of operation of the control apparatus 40 illustrated in FIG. 1 and FIG. 2 in a case of sunset. The operation in the flowchart illustrated in FIG. 5 is started when the PCS 10 is in the operation mode (operating state).

In step S11, the control unit 50 of the control apparatus 40 acquires information indicating that the PCS 10 is put into the standby mode. The PCS 10 is put into the operation mode, for example, in the daytime when the power generation is performed by the PV panel 2. For example, when the PCS 10 is in the operation mode, the power conversion by the inverter 23 is performed, and the AC switches 25 are closed. Note that, as described above, even when the PCS 10 is in the standby mode or in the operation mode, the DC switches 21 are kept closed.

In step S12, the control unit 50 of the control apparatus 40 determines whether the soundness check function of the PCS 10 according to the present disclosure is enabled. When the control unit 50 determines that the soundness check function for the DC switches 21 according to the present disclosure is enabled (Yes side), the processing proceeds to step S13. In contrast, when the control unit 50 determines that the soundness check function for the DC switches 21 according to the present disclosure is not enabled (No side), the processing proceeds to step S19.

In step S13, the first operation control unit 51 of the control unit 50 determines whether the PV voltage $V_{PV}$ acquired by the acquisition unit 41 is less than the predetermined third threshold $V_{TH3}$, when the information indicating that the PCS 10 is put into the standby state is acquired. For example, in FIG. 3E, the PV voltage $V_{PV}$ is less than the predetermined third threshold $V_{TH3}$ at time $t_4$.

When the first operation control unit 51 determines that the PV voltage $V_{PV}$ is less than the predetermined third threshold $V_{TH3}$ (Yes side), the processing proceeds to step S14. In contrast, when the first operation control unit 51 determines that the PV voltage $V_{PV}$ is greater than or equal to the predetermined third threshold $V_{TH3}$ (No side), the processing in step S13 is repeated until the PV voltage $V_{PV}$ becomes less than the predetermined third threshold $V_{TH3}$.

When the first operation control unit 51 of the control unit 50 determines that the PV voltage $V_{PV}$ is less than the predetermined third threshold $V_{TH3}$ in step S13 (S13: Yes), the first operation control unit 51 of the control unit 50 outputs the operation instruction to open the DC switches 21 in step S14. As a result, the DC switches 21 are opened. The clocking unit 52 of the control unit 50 clocks the elapsed time after the operation instruction to open the DC switches 21 is output (after DC switches 21 are opened). For example, in FIG. 3B, the DC switches 21 are opened at time $t_4$.

In step S15, the soundness determination unit 53 of the control unit 50 acquires the elapsed time clocked by the clocking unit 52, and determines whether the elapsed time clocked by the clocking unit 52 becomes greater than or equal to the predetermined time $T_2$. For example, in FIG. 3E, it is determined that the elapsed time becomes greater than or equal to the predetermined time $T_2$ at a time between time $t_4$ and time $t_5$.

When the soundness determination unit 53 determines that the elapsed time becomes greater than or equal to the predetermined time $T_2$ (Yes side), the processing proceeds to step S16. In contrast, when the soundness determination unit 53 determines that the elapsed time is not greater than or equal to the predetermined time $T_2$ (No side), the processing in step S15 is repeated until the elapsed time becomes greater than or equal to the predetermined time $T_2$.

In step S16, the soundness determination unit 53 of the control unit 50 acquires the PV voltage $V_{PV}$ and the capacitor voltage $V_{DCC}$ when the elapsed time after the DC switches 21 are opened becomes greater than or equal to the predetermined time $T_2$. Further, the soundness determination unit 53 calculates the difference voltage $V_2$ that is the difference between the acquired PV voltage $V_{PV}$ and the acquired capacitor voltage $V_{DCC}$. The soundness determination unit 53 determines whether the difference voltage $V_2$ is greater than the predetermined fourth threshold $V_{TH4}$.

For example, in FIG. 3E, the soundness determination unit 53 calculates the difference voltage $V_2$ between the PV voltage $V_{PV}$ indicated by the solid line and the capacitor voltage $V_{DCC}$ indicated by the dashed line, at a time between time $t_4$ and time $t_5$. Further, the soundness determination unit 53 determines whether the calculated difference voltage $V_2$ is greater than the predetermined fourth threshold $V_{TH4}$. Note that, for example, the predetermined fourth threshold $V_{TH4}$ is a value previously evaluated by simulation or the like, and is preferably a fixed value that enables sure determination of failure without being affected by weather and the like.

For example, as illustrated in FIG. 3E, when the DC switches 21 are normally opened in step S14 and the predetermined time $T_2$ elapses in step S15, the PV voltage $V_{PV}$ indicated by the solid line is gradually reduced because the power generation amount by the PV panel is gradually reduced due to sunset. In contrast, the capacitor voltage $V_{DCC}$ indicated by the dashed line is steeply reduced because the capacitor is discharged by, for example, the unillustrated discharge circuit or the unillustrated discharge resistor. In other words, the PV voltage $V_{PV}$ and the capacitor voltage $V_{DCC}$ are different in voltage reduction speed.

Accordingly, when the DC switches 21 are normally opened in step S14, the difference voltage $V_2$ between the PV voltage $V_{PV}$ and the capacitor voltage $V_{DCC}$ becomes a value greater than the predetermined fourth threshold $V_{TH4}$. Therefore, when the soundness determination unit 53 determines that the difference voltage $V_2$ is greater than the predetermined fourth threshold $V_{TH4}$, the soundness determination unit 53 determines that failure or abnormality does not occur in the DC switches 21, the DC switches 21 are normally opened, and the DC switches 21 are normal (sound).

In contrast, for example, when the DC switches 21 are not normally opened in step S14 and the predetermined time $T_2$ elapses in step S15, the PV voltage $V_{PV}$ and the capacitor voltage $V_{DCC}$ are in a situation different from the example illustrated in FIG. 3E. In other words, in the case where the DC switches 21 are not normally opened, the direct-current busbars 11 are not shut off. Therefore, the PV voltage $V_{PV}$ and the capacitor voltage $V_{DCC}$ are both gradually reduced gently due to sunset. Thus, the capacitor voltage $V_{DCC}$ is not steeply reduced as illustrated in FIG. 3E.

Accordingly, when the DC switches 21 are not normally opened in step S14, the difference voltage $V_2$ between the PV voltage $V_{PV}$ and the capacitor voltage $V_{DCC}$ does not become a value greater than the predetermined fourth threshold $V_{TH4}$. Therefore, when the soundness determination unit 53 determines that the difference voltage $V_2$ is less than or equal to the predetermined fourth threshold $V_{TH4}$, the soundness determination unit 53 determines that failure or abnormality occurs in the DC switches 21, the DC switches 21 are not normally opened, and the DC switches 21 are abnormal (unsound).

Therefore, when the soundness determination unit 53 determines that the difference voltage $V_2$ is greater than the predetermined fourth threshold $V_{TH4}$ in step S16 (Yes side), the soundness determination unit 53 determines that the DC switches 21 are normal, and the processing proceeds to step S17. In contrast, when the soundness determination unit 53 determines that the difference voltage $V_2$ is less than or equal to the predetermined fourth threshold $V_{TH4}$ (No side), the soundness determination unit 53 determines that the DC switches 21 are abnormal, and the processing proceeds to step S20.

When the second operation control unit 54 of the control unit 50 acquires a determination result indicating that the DC switches 21 are normal, by the soundness determination unit 53 (S16: Yes), the second operation control unit 54 of the control unit 50 outputs the operation instruction to close the DC switches 21 in step S17. As a result, the DC switches 21 are closed. Thereafter, the control unit 50 ends the soundness check operation for the DC switches 21 according to the present disclosure, and the processing proceeds to step S18. As a result, for example, as illustrated in FIGS. 3B and 3E, the DC switches 21 are closed at time $t_5$.

In step S18, the control unit 50 shifts the operation of the PCS 10 to the normal operation. Thereafter, the control unit 50 ends the processing in the flowchart. In this case, it is already after sunset, and the PCS 10 is already put into the standby mode as illustrated in FIGS. 3C and 3E. Therefore, the PV voltage $V_{PV}$ and the capacitor voltage $V_{DCC}$ are not immediately increased, but are increased again at sunrise.

When it is determined that the soundness check function for the DC switches 21 according to the present disclosure is not enabled in step S12 (S12: No), the DC switches 21 are kept closed in step S19. In this case, the soundness check operation for the DC switches 21 according to the present disclosure is not performed, and the control unit 50 causes the processing to proceed to step S18.

Note that when it is determined that the soundness check function for the DC switches 21 according to the present disclosure is not enabled in step S12 (S12: No), the control unit 50 may notify information (alert) indicating that the soundness check function for the DC switches 21 has abnormality, to the unillustrated host apparatus, the unillustrated display apparatus, and the like. Thereafter, the control unit 50 may cause the processing to proceed to step S18. Alternatively, for example, the control unit 50 may stop the operation of the PCS 10 until a fact that the DC switches 21 are normal (sound) is confirmed.

When it is determined that the difference voltage $V_2$ is less than or equal to the predetermined fourth threshold $V_{TH4}$ in step S16 (S16: No), the second operation control unit 54 outputs the operation instruction to stop the PCS 10 without outputting the operation instruction to close the DC switches 21 in step S20. In other words, when the soundness determination unit 53 determines that the DC switches 21 are abnormal in step S16, the second operation control unit 54 outputs the operation instruction to stop the PCS 10 without outputting the operation instruction to close the DC switches 21. Further, the control unit 50 ends the processing in the flowchart. Note that the other operation in step S20 is similar to the operation in step S10.

<Hardware Configuration Example>

Figure 6:
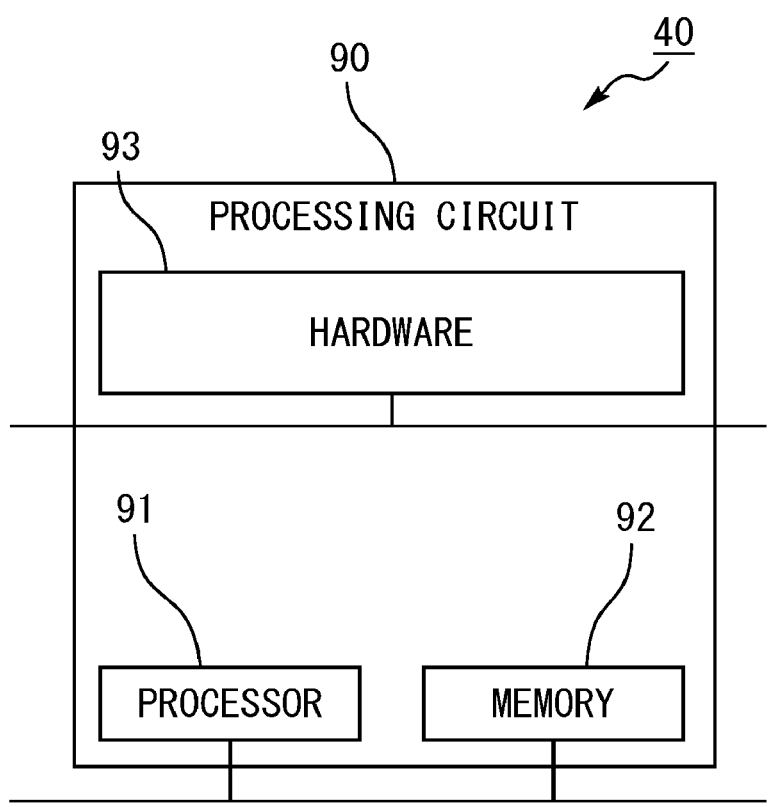
FIG. 6 is a conceptual diagram illustrating a hardware configuration example of a processing circuit held by the control apparatus according to the embodiment illustrated in FIG. 1 to FIG. 5.

FIG. 6 is a conceptual diagram illustrating a hardware configuration example of the processing circuit 90 held by the control apparatus 40 according to the embodiment illustrated in FIG. 1 to FIG. 5. The above-described functions are realized by the processing circuit 90. As one aspect, the processing circuit 90 includes at least one processor 91 and at least one memory 92. As another aspect, the processing circuit 90 includes at least one piece of dedicated hardware 93.

In a case where the processing circuit 90 includes the processor 91 and the memory 92, each of the functions is realized by software, firmware, or a combination of software and firmware. At least one of the software and the firmware is described as a program. At least one of the software and the firmware is stored in the memory 92. The processor 91 reads out and executes a program stored in the memory 92, to realize each of the functions.

In a case where the processing circuit 90 includes the dedicated hardware 93, the processing circuit 90 is, for example, a single circuit, a composite circuit, a programmed processor, or a combination thereof. Each of the functions is realized by the processing circuit 90.

A part or all of the functions of the control apparatus 40 may be configured by the hardware, or may be configured as programs executed by the processor. In other words, the control apparatus 40 can be realized by a computer and programs, and the programs can be stored in a storage medium or can be provided through a network.

Action and Effects by Embodiment

As described above, according to the embodiment illustrated in FIG. 1 to FIG. 6, it is possible to suppress failure expansion in the PCS 10 by routinely checking whether the DC switches 21 in the photovoltaic system 1 are normally operated (opened), and previously routinely checking soundness of the DC switches 21.

For example, when failure of the PCS 10 is detected, the DC switches 21 must be opened; however, if the DC switches 21 themselves are failed, the control unit 50 cannot open the DC switches 21. In a case where failure of the PCS 10 is detected but the DC switches 21 cannot be opened, the power generated by the PV panel 2 continuously flows through the PCS 10 in which failure is detected. This increases the risk of failure expansion in the PCS 10.

However, according to the embodiment illustrated in FIG. 1 to FIG. 6, when it is determined that the DC switches 21 are abnormal in step S6 or S16, the PCS 10 is stopped in step S10 or S20. As a result, the PCS 10 is not operated while the DC switches 21 themselves are failed. This makes it possible to suppress failure expansion in the PCS 10 by repairing or replacing the DC switches 21 at an appropriate timing.

Further, according to the embodiment illustrated in FIG. 1 to FIG. 6, abnormality and failure of the DC switches 21 are determined using the difference voltage $V_1$ between the PV voltage $V_{PV}$ and the capacitor voltage $V_{DCC}$, and the predetermined second threshold $V_{TH2}$, at sunrise. Alternatively, abnormality and failure of the DC switches 21 are determined using the difference voltage $V_2$ between the PV voltage $V_{PV}$ and the capacitor voltage $V_{DCC}$, and the predetermined fourth threshold $V_{TH4}$, at sunset. This makes it possible to determine soundness of the DC switches 21 by a simple configuration and simple calculation.

Further, according to the embodiment illustrated in FIG. 1 to FIG. 6, abnormality and failure of the DC switches 21 are determined at sunrise and at sunset. This makes it possible to routinely check soundness of the DC switches 21. Further, even in a case where soundness of the DC switches 21 cannot be checked at one of sunrise and sunset, soundness of the DC switches 21 can be checked at the other of sunrise and sunset.

Further, according to the embodiment illustrated in FIG. 1 to FIG. 6, each of the predetermined second threshold $V_{TH2}$ and the predetermined fourth threshold $V_{TH4}$ is, for example, a value previously evaluated by simulation or the like, and is preferably a fixed value that enables sure determination of failure without being affected by weather and the like. This makes it possible to suppress erroneous detection of failure and abnormality of the DC switches 21.

Supplementary Matters of Embodiment

As described above, according to the embodiment illustrated in FIG. 1 to FIG. 6, the operation in the case of sunrise illustrated in FIG. 4, and the operation in the case of sunset illustrated in FIG. 5 are both performed. However, the operation is not limited thereto. Each of the components may be configured so as to perform any one of these operations (may have function so as to perform any one of operations), and any one of these operations may be performed by each of the components. According to the embodiment illustrated in FIG. 1 to FIG. 6, similar action and effects can be achieved even when one or both of the operations are performed.

Further, according to the embodiment illustrated in FIG. 1 to FIG. 6, as one aspect of the present disclosure, the PCS 10 in the photovoltaic system 1 and the control apparatus 40 held by the PCS 10 are described as an example; however, the aspect is not limited thereto. The present disclosure can be realized as a method for checking soundness of the DC switches 21, including processing steps by the units of the control apparatus 40.

Further, the present disclosure can be realized as a program for checking soundness of the DC switches 21, causing a computer to execute processing steps by the units of the control apparatus 40.

Further, the present disclosure can be realized as a storage medium (non-transitory computer-readable medium) storing the program for checking soundness of the DC switches 21. The program for checking soundness of the DC switches 21 can be distributed by being stored in a removable medium such as a CD (Compact Disc), a DVD (Digital Versatile Disc), and a USB (Universal Serial Bus) memory. Note that the program for checking soundness of the DC switches 21 may be uploaded to a network through an unillustrated network interface held by the control apparatus 40 or the like, and may be downloaded from the network and stored in the storage unit 43 or the like.

The above-described detailed description will clarify features and advantages of the embodiment. This is for the purpose of showing that the claims cover the features and the advantages of the embodiment as described above without departing from the spirit and the scope of rights. Further, those skilled in the art should be able to easily conceive any improvements and changes. Accordingly, the scope of the inventive embodiment is not intended to be limited to the above description, and the claims can also be based on appropriate improvements and equivalents included in the scope disclosed in the embodiment.

REFERENCE SIGNS LIST

1 Photovoltaic system
2 Solar panel (solar cell panel, PV panel)
3 Transformer
4 Alternating-current power system (system)
10 Power conversion apparatus (PCS, PV-PCS)
11 Direct-current busbar
11P Positive electrode direct-current busbar
11N Negative electrode direct-current busbar
12 Alternating-current circuit
21 Direct-current switch (direct-current breaker, DC switch)
22 Direct-current capacitor (DC capacitor)
23 Inverter circuit (inverter)
24 Alternating-current filter (AC filter)
24a Alternating-current reactor (AC reactor)
24b Alternating-current capacitor (AC capacitor)
25 Alternating-current switch (alternating-current breaker, AC switch)
31 First voltage sensor
32 First current sensor
33 Second voltage senor
34 Third voltage sensor
35 Second current sensor
36 Fourth voltage sensor
40 Control apparatus
41 Acquisition unit (voltage acquisition unit)
42 Output unit
43 Storage unit
45 System bus (bus)
50 Control unit
51 First operation control unit
52 Clocking unit
53 Soundness determination unit
54 Second operation control unit
55 Inverter control unit
90 Processing circuit
91 Processor
92 Memory
93 Hardware
$I_{ac}$ Alternating current value (inverter output current, current value)
$I_{dc}$ Direct current value (direct current, current value) $t_0$ to $t_5$ Time
$T_1$ Predetermined time (predetermined first time)
$T_2$ Predetermined time (predetermined second time)
$V_1$ Difference voltage (first difference voltage value)
$V_2$ Difference voltage (second difference voltage value)
$V_{ac}$ Alternating-current voltage value (inverter output voltage, voltage value)
$V_{DCC}$ Direct-current voltage value (capacitor voltage, DCC voltage, voltage value, second direct-current voltage value)
$V_{Grid}$ Alternating-current voltage value (system voltage, voltage value)
$V_{PV}$ Direct-current voltage value (PV voltage, voltage value, first direct-current voltage value)
$V_{TH1}$ First threshold
$V_{TH2}$ Second threshold
$V_{TH3}$ Third threshold
$V_{TH4}$ Fourth threshold

The invention claimed is:
1. A control apparatus in a power conversion apparatus of a photovoltaic system, the power conversion apparatus including a direct-current switch and a direct-current capacitor that are disposed, in a direct-current busbar connected to a solar panel, in order from a solar panel side, the control apparatus comprising:
a voltage acquisition circuit configured to acquire a first direct-current voltage value as a voltage of the solar panel and a second direct-current voltage value as a voltage of the direct-current capacitor;

a first operation control circuit configured to open the direct-current switch when the power conversion apparatus is in a waiting state and the first direct-current voltage value acquired by the voltage acquisition circuit is greater than a predetermined first threshold;

a clocking circuit configured to, when the direct-current switch is opened by the first operation control circuit, clock an elapsed time after the direct-current switch is opened;

a soundness determination circuit configured to calculate a first difference voltage value that is a difference between the first direct-current voltage value and the second direct-current voltage value acquired by the voltage acquisition circuit when the power conversion apparatus is in the waiting state and the direct-current switch is opened, and the elapsed time clocked by the clocking circuit is greater than or equal to a predetermined first time, to determine that the direct-current switch is normal when the first difference voltage value is greater than a predetermined second threshold, and to determine that the direct-current switch is abnormal when the first difference voltage value is less than or equal to the predetermined second threshold; and a second operation control circuit configured to close the direct-current switch when the soundness determination circuit determines that the direct-current switch is normal, and to stop the power conversion apparatus without closing the direct-current switch when the soundness determination circuit determines that the direct-current switch is abnormal.

2. A power conversion apparatus of a photovoltaic system, the power conversion apparatus including a direct-current switch and a direct-current capacitor that are disposed, in a direct-current busbar connected to a solar panel, in order from the solar panel side, the power conversion apparatus comprising:

a first voltage sensor configured to detect a first direct-current voltage value as a voltage of the solar panel;

a second voltage sensor configured to detect a second direct-current voltage value as a voltage of the direct-current capacitor; and the control apparatus according to claim 1, wherein the voltage acquisition circuit acquires the first direct-current voltage value from the first voltage sensor, and acquires the second direct-current voltage value from the second voltage sensor.

3. A control apparatus in a power conversion apparatus of a photovoltaic system, the power conversion apparatus including a direct-current switch and a direct-current capacitor that are disposed, in a direct-current busbar connected to a solar panel, in order from a solar panel side, the control apparatus comprising:

a voltage acquisition circuit configured to acquire a first direct-current voltage value as a voltage of the solar panel and a second direct-current voltage value as a voltage of the direct-current capacitor;

a first operation control circuit configured to open the direct-current switch when the power conversion apparatus is in a waiting state and the first direct-current voltage value acquired by the voltage acquisition circuit is less than a predetermined third threshold;

a clocking circuit configured to, when the direct-current switch is opened by the first operation control circuit, clock an elapsed time after the direct-current switch is opened;

a soundness determination circuit configured to calculate a second difference voltage value that is a difference between the first direct-current voltage value and the second direct-current voltage value acquired by the voltage acquisition circuit when the power conversion apparatus is in the waiting state and the direct-current switch is opened, and the elapsed time clocked by the clocking circuit is greater than or equal to a predetermined second time, to determine that the direct-current switch is normal when the second difference voltage value is greater than a predetermined fourth threshold, and to determine that the direct-current switch is abnormal when the second difference voltage value is less than or equal to the predetermined fourth threshold; and a second operation control circuit configured to close the direct-current switch when the soundness determination circuit determines that the direct-current switch is normal, and to stop the power conversion apparatus without closing the direct-current switch when the soundness determination circuit determines that the direct-current switch is abnormal.

4. A power conversion apparatus of a photovoltaic system, the power conversion apparatus including a direct-current switch and a direct-current capacitor that are disposed, in a direct-current busbar connected to a solar panel, in order from the solar panel side, the power conversion apparatus comprising:

a first voltage sensor configured to detect a first direct-current voltage value as a voltage of the solar panel;

a second voltage sensor configured to detect a second direct-current voltage value as a voltage of the direct-current capacitor; and the control apparatus according to claim 3, wherein the voltage acquisition circuit acquires the first direct-current voltage value from the first voltage sensor, and acquires the second direct-current voltage value from the second voltage sensor.

5. A control apparatus in a power conversion apparatus of a photovoltaic system, the power conversion apparatus including a direct-current switch and a direct-current capacitor that are disposed, in a direct-current busbar connected to a solar panel, in order from a solar panel side, the control apparatus comprising:

a voltage acquisition circuit configured to acquire a first direct-current voltage value as a voltage of the solar panel and a second direct-current voltage value as a voltage of the direct-current capacitor;

a first operation control circuit configured to open the direct-current switch when the power conversion apparatus is in a waiting state and the first direct-current voltage value acquired by the voltage acquisition circuit is greater than a predetermined first threshold, and to open the direct-current switch when the power conversion apparatus is in the waiting state and the first direct-current voltage value acquired by the voltage acquisition circuit is less than a predetermined third threshold;

a clocking circuit configured to, when the direct-current switch is opened by the first operation control circuit, clock an elapsed time after the direct-current switch is opened;

a soundness determination circuit configured to calculate a first difference voltage value that is a difference between the first direct-current voltage value and the second direct-current voltage value acquired by the voltage acquisition circuit when the power conversion apparatus is in the waiting state and the direct-current switch is opened, and the elapsed time clocked by the clocking circuit is greater than or equal to a predetermined first time, to determine that the direct-current switch is normal when the first difference voltage value is greater than a predetermined second threshold, to determine that the direct-current switch is abnormal when the first difference voltage value is less than or equal to the predetermined second threshold, to calculate a second difference voltage value that is a difference between the first direct-current voltage value and the second direct-current voltage value acquired by the voltage acquisition circuit when the power conversion apparatus is in the waiting state and the direct-current switch is opened, and the elapsed time clocked by the clocking circuit is greater than or equal to a predetermined second time, to determine that the direct-current switch is normal when the second difference voltage value is greater than a predetermined fourth threshold, and to determine that the direct-current switch is abnormal when the second difference voltage value is less than or equal to the predetermined fourth threshold; and a second operation control circuit configured to close the direct-current switch when the soundness determination circuit determines that the direct-current switch is normal, and to stop the power conversion apparatus without closing the direct-current switch when the soundness determination circuit determines that the direct-current switch is abnormal.

6. A power conversion apparatus of a photovoltaic system, the power conversion apparatus including a direct-current switch and a direct-current capacitor that are disposed, in a direct-current busbar connected to a solar panel, in order from the solar panel side, the power conversion apparatus comprising:

a first voltage sensor configured to detect a first direct-current voltage value as a voltage of the solar panel;

a second voltage sensor configured to detect a second direct-current voltage value as a voltage of the direct-current capacitor; and the control apparatus according to claim 5, wherein the voltage acquisition circuit acquires the first direct-current voltage value from the first voltage sensor, and acquires the second direct-current voltage value from the second voltage sensor.

\* \* \* \* \*